June 1, 1937.  R. H. WILLIAMSON  2,082,673
UNLOADER AND SPREADER
Filed July 29, 1936
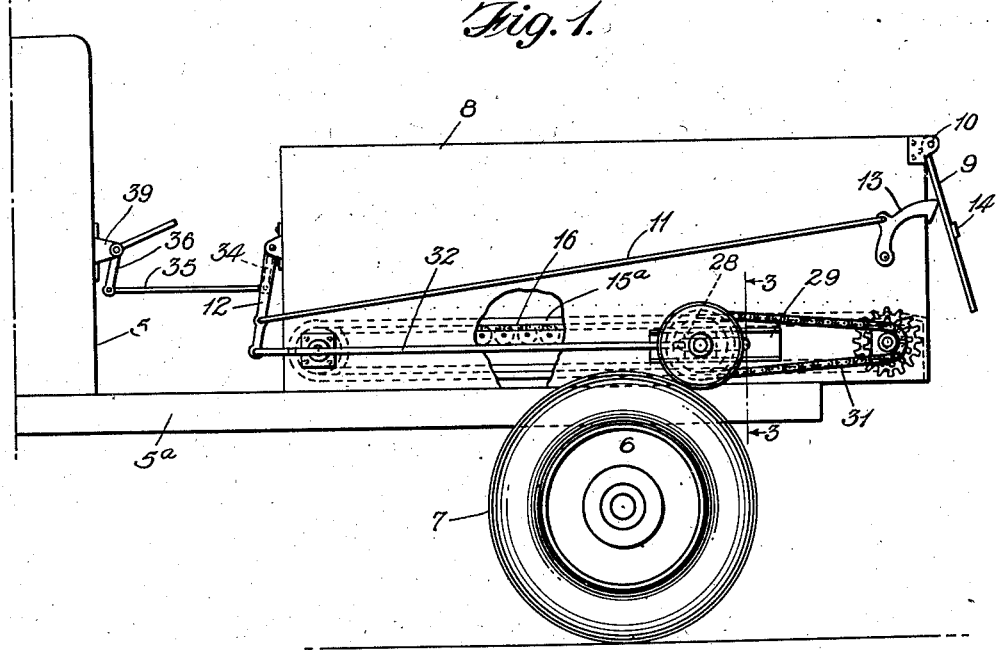
Fig. 1.
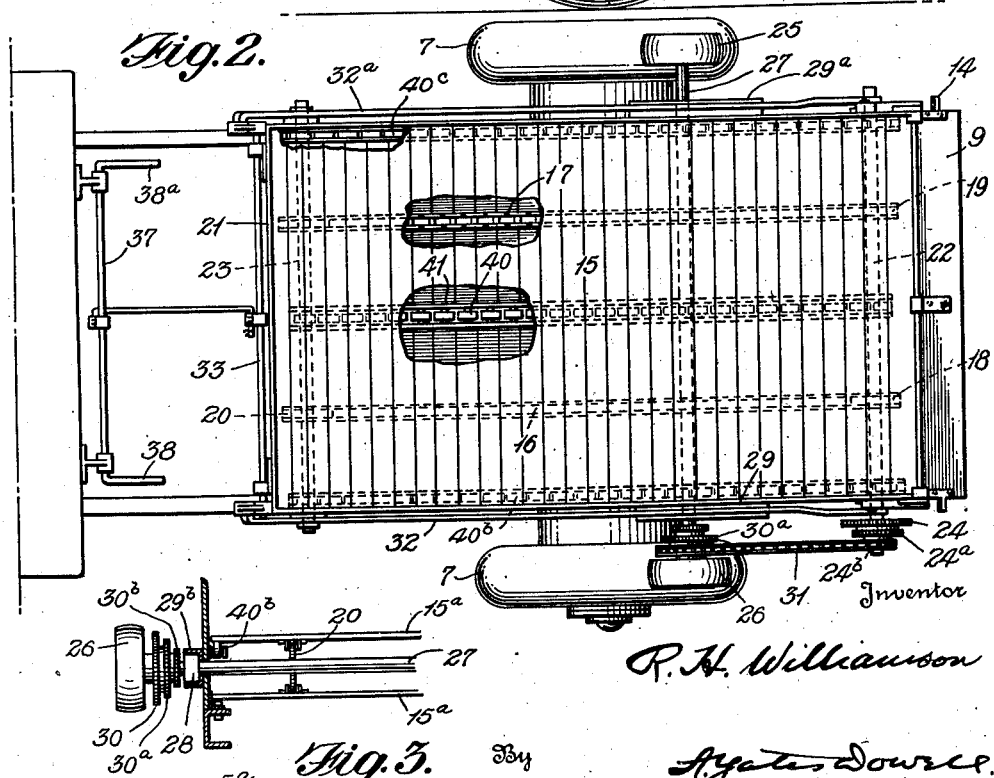
Fig. 2.
Fig. 3.
Inventor
R. H. Williamson
By
A. Yates Dowell
Attorney Patented June 1, 1937

2,082,673

UNITED STATES PATENT OFFICE 2,082,673

UNLOADER AND SPREADER

Rufus H. Williamson, Millerville, Ala.

Application July 29, 1936, Serial No. 93,274

9 Claims. (Cl. 214—83)

This invention relates to apparatus for unloading and spreading gravel, top soil and like materials in the building of roads, preparation of ground surfaces and other operations wherein it is desired to apply a layer of loose material to the ground or road surface.

The primary object of the invention is to provide apparatus of the above type which may be built in or combined with a truck body and easily, quickly and operatively applied to and removed from the conventional truck chassis without requiring any material changes in the latter.

Another object of the invention is to provide a spreader body wherein the spreader mechanism is strong and rugged and adapted to form a firm support for the relatively heavy material carried by the body.

Another object of the invention is to provide a spreader of the type specified wherein the spreading or discharge operation is readily adjustable, and also wherein the spreading action may be readily controlled by the driver of the truck.

A further object is to provide a spreader body which requires no tilting to discharge the material with its resultant complicated tilting mechanism and special design of truck chassis.

The foregoing and other objects of the invention will become apparent in view of the following description taken in conjunction with the drawing, wherein, Fig. 1 is a view of the side elevation of a truck having mounted thereon a spreader body embodying the features of the present invention, the side of said body being partly broken away to show the mechanism in rear thereof.

Fig. 2 is a top plan view of Fig. 1 with the movable spreader body or conveyor broken away to show certain parts therebelow.

Fig. 3 is a fragmentary sectional view taken substantially on line 3—3 of Fig. 1.

The apparatus is preferably built in operative relation with a body and the latter arranged so that it may be detachably applied to a conventional truck chassis. Referring to the drawing in detail, the truck chassis is generally indicated at 5 and the rear wheels of the truck at 6, said wheels having mounted thereon tires 7. The truck chassis is provided with side sills 5a to which the spreader body, generally indicated at 8, may be detachably bolted.

The body 8 may be of conventional construction and has at the rear thereof an end gate 9 which is pivotally mounted at its upper extremity in brackets 10.

To provide for control of the end gate from the driver's seat, a rod 11 extends forwardly and connects with a lever 12, which is actuated in a manner to be described, the rear end of the rod 11 being connected to a latch 13 adapted to engage a latch member 14 fastened to the end gate 9. When the latch 13 is released from the latch member 14, the end gate is forced open by the discharged material, and then closes by gravity. The latch 13 and mechanism for throwing the traveling conveyor into operation are preferably actuated by a dual control to be subsequently described.

The traveling floor or conveyor through the medium of which the material is discharged is generally indicated at 15, said floor being formed of a plurality of conveyor elements such as slats 15a. A pair of conveyor chains 16 and 17 are provided and are trained at opposite extremities over sprocket wheels 18, 19, 20, and 21, the sprockets 18 and 19 being mounted on a cross shaft 22 and the sprockets 20 and 21 being mounted on a shaft 23. The shaft 23 is an idler shaft, while the shaft 22 is the drive shaft and has mounted on one end thereof a set of change speed gears 24, 24a, and 24b. The slats are preferably each pivotally secured to a chain link with sufficient play to permit free movement of the slats and chain.

The drive is selectively applied to the gears 24, 24a or 24b through the medium of a shiftable drive assembly comprising friction gears or wheels 25 and 26, which are secured on the opposite ends of a shaft 27 mounted in bearing blocks 28. These bearing blocks are mounted to slide in bearing guides or housings 29 and 29a. The construction and arrangement of this particular assembly is best shown in Fig. 3, and it will be noted that the guides 29 are each formed with flanges 29b which define a track in which block 28 is slidably mounted. Also secured on the end of the shaft 22 is a set of change speed gears 30, 30a, and 30b, and a sprocket chain 31 connects any selected one of these gears with one of its gears 24, 24a, and 24b.

The sliding bearing blocks have connected thereto links or rods 32 and 32a which extend forwardly and are pivotally connected at their forward ends to the levers 12, the latter being connected at their upper ends to a cross shaft 33. To actuate the shaft 33, a lever 34 is connected at one end thereto and at its opposite end is connected with link 35 which extends forwardly and in turn is connected to a lever 36 secured on a cross shaft 37 having handles 38 and 38a on opposite ends thereof within convenient reach of a driver or other operator in the seat of the truck. The shaft 37 is mounted in bearing brackets 39 which may be detachably secured to the frame of the truck body adjacent the driver's seat.

Since the movable floor or conveyor 15 must support a relatively heavy load, and since also it is essential that there be a minimum of friction to reduce the drive on the conveyor, a bearing is provided for this conveyor, said bearing preferably comprising a series of bearing rollers 40 having trunnions which are rotatably mounted in rails 41, the latter being spaced apart so that any material which may pass through the floor onto the roller assembly and interfere with free movement thereof will pass between the spaced rails. There are preferably three sets of these bearing assemblies arranged in spaced parallel relation, one in the center of the body and a set on opposite sides of the body, indicated at 40b and 40c, so that the conveyor slats are supported firmly across the entire width or length thereof.

In operation, assuming the body 8 has been loaded with gravel, top soil, or the like, when the driver reaches a point along the road where it is desired to spread the gravel, the handle 38 or 38a is manipulated to rotate the shaft 33 to the left or in a clockwise direction, to thereby pull the shaft 27 forwardly and the friction wheels 25 and 26 carried thereby, bringing said wheels into frictional engagement with the tires of the truck, whereupon the drive is transmitted to the conveyor drive shaft 22, thereby causing the sprocket chains 16 and 17 to move rearwardly carrying the conveyor floor 15 therewith. Simultaneously with this operation, the end gate latches 13 are released from the latch members 14, and the end gate is permitted to move clear of the body and permit the material to clear.

The body is preferably detachably mounted through the medium of suitably securing bolts to the chassis frame members so that said body may be easily and quickly removed or replaced at any time desired.

The friction wheels 25 and 26 may be comprised of resilient material such as rubber or rubber composition and are of such width and diameter as to insure proper frictional contact and gripping engagement with the wheel tires consistent with the load to be moved by the conveyor.

The improved spreader is particularly adapted for handling heavy material such as sand, gravel, and the like, and the conveyor driving mechanism is capable of withstanding shocks and jars incident to the handling of these heavy materials. The conveyor drive mechanism has been particularly devised for use in conjunction with tires of the low pressure pneumatic type, so that there is a certain amount of give between the main drive wheel of the vehicle and the friction wheel of the conveyor drive. Since the bearing for the friction wheel slides horizontally and is held rigidly against vertical movement, the force required to hold the friction wheel in driving engagement with the truck tire is reduced to a minimum. While the conveyor or slat floor is shown as continuous in the present instance, it may prove desirable to omit the slats from one side or a portion of one side and facilitate escape of any material that may pass between the slats. If the conveyor floor is driven at the proper speed, a complete discharge of the material will be effected at each half-cycle of travel of the conveyor. It will be understood that the foregoing and other minor changes in design and details of construction may be adopted within the scope of the invention as defined by the appended claims.

I claim:

1. In combination with a vehicle chassis having wheels with pneumatic tires thereon, an unloader and spreader attachment comprising a body mounted on said chassis having a movable floor made up of a plurality of conveyor elements, means connecting said elements in series to provide an endless conveyor, a rotatable friction wheel operatively connected to the conveyor for driving the latter, a shaft for said wheel, a slidable bearing for said shaft, and means for shifting the bearing to move the friction wheel into and out of driving engagement with one of said tires.

2. In combination with a vehicle chassis having wheels with resilient tires thereon, an unloader and spreader attachment particularly adapted for gravel, sand and like materials comprising a body detachably mounted on said chassis and having a movable floor made up of a plurality of conveyor slats, means connecting said slats in series to provide an endless conveyor, a rotatable friction wheel operatively connected to the conveyor for driving the latter, a shaft for said wheel, a substantially horizontally slidable bearing for said shaft, and manually operable means for shifting said bearing to move the friction wheel into and out of driving engagement with one of said tires.

3. In combination with a vehicle chassis having wheels with resilient tires thereon, an unloader and spreader attachment particularly adapted for gravel, sand and like materials comprising a body detachably mounted on said chassis and having a movable floor made up of a plurality of conveyor slats, means connecting said slats in series to provide an endless conveyor, a rotatable friction wheel operatively connected to the conveyor for driving the latter, a shaft for said wheel, a slidable bearing for said shaft, manually operable means for shifting said bearing to move the friction wheel into and out of driving engagement with one of said tires, and means for adjusting the speed of travel of the conveyor.

4. In combination with a vehicle chassis having wheels with resilient tires thereon, an unloader and spreader attachment comprsing a body mounted on said chassis and having a movable floor made up of a plurality of conveyor slats, sprocket chains connecting said slats in series to provide an endless conveyor, sprockets over which said chains are trained, a drive shaft for said sprockets, a rotatable friction wheel for transmitting the drive from a wheel of the chassis to said drive shaft, and a shaft on which said friction wheel is mounted, a substantially horizontally slidable bearing for said latter shaft, manually operable means for shifting said bearing to move the friction wheel into and out of driving engagement with one of said tires, and change speed gears mounted on said shafts and having a driving connection with one another.

5. In combination with a vehicle chassis having wheels with resilient tires thereon, an unloader and spreader attachment comprising a body mounted on said chassis and having a movable floor made up of a plurality of conveyor slats, sprocket chains connecting said slats in series to provide a conveyor, sprocket wheels located at opposite extremities of the conveyor over which said chains are trained, a drive shaft for said sprockets having a plurality of change speed gears on one end thereof, a friction wheel for transmitting the drive from a wheel of the chassis to the sprocket drive shaft, change speed gears also associated with said friction wheel and having a drive connection with said first-named gears, a shaft on which said friction wheel is mounted, a substantially horizontally shiftable bearing for said latter shaft, and manually operable means for said bearing whereby the friction wheel may be moved into and out of driving engagement with one of said tires.

6. In combination with a wheeled vehicle chassis, an unloader and spreader attachment particularly adapted for gravel, sand and analogous material, comprising a body mounted on said chassis and having a movable floor made up of a plurality of conveyor slats, endless sprocket chains connecting said slats in series, sprocket wheels located at opposite extremities of said body over which said chains are trained, a drive shaft for said sprockets extending laterally of said body and having a plurality of change speed gears mounted on one end thereof, a pair of friction wheels and a shaft therefor provided with change speed gears having drive connection with said first named gears, a slidable bearing for said friction wheel shaft, and manually operable means connected to said bearing for moving the friction wheels into and out of driving engagement with the wheels of the vehicle chassis.

7. In combination with a wheeled vehicle chassis, an unloader and spreader attachment particularly adapted for gravel, sand and analogous materials comprising a body mounted on said chassis and having a movable floor made up of a plurality of conveyor elements, endless means linking said elements in series to provide a conveyor, a rotatable friction wheel operatively connected to the conveyor for driving the latter, a shiftable bearing support for said friction wheel, an end gate pivotally connected to the rear end of said body, a manually operable lever located adjacent the driver's seat, and linkage mechanism connected to said latch and also to said bearing support and having a common connection with said lever whereby upon actuation of the latter the friction wheel is thrown into driving engagement with a wheel of the chassis and the latch is released.

8. In combination with a vehicle chassis having wheels with pneumatic tires thereon, an unloader and spreader attachment particularly adapted for sand, gravel and like materials comprising a body adapted to be mounted on said chassis having a movable floor made up of a plurality of conveyor elements, means connecting said elements in series to provide an endless conveyor, a rotatable friction wheel operatively connected to the conveyor for driving the latter, a shaft for said friction wheel, a bearing for said shaft movably mounted in a guideway arranged longitudinally of the body, and manually operable means for shifting said bearing forwardly and rearwardly to move the friction wheel into and out of driving engagement with one or more of the pneumatic tires of the chassis wheel.

9. In combination with a vehicle chassis having wheels with resilient tires thereon, an unloader and spreader attachment particularly adapted for sand, gravel and like material comprising a body detachably mounted on said chassis and having a movable floor made up of a plurality of conveyor elements, means connecting said elements in series to provide an endless conveyor, a rotatable friction wheel operatively connected to the conveyor for driving the latter, a shaft for said wheel, a movable bearing for said shaft, and a guide member for said bearing arranged to hold the shaft and bearing against vertical movement while at the same time permitting the shaft and bearing to move longitudinally of the body whereby the friction wheel may be brought into driving engagement with a tire of the vehicle in a direction tangential to said tire.

RUFUS H. WILLIAMSON.